United States Patent
Rozen et al.

(10) Patent No.: US 8,171,187 B2
(45) Date of Patent: May 1, 2012

(54) SYSTEM AND METHOD FOR ARBITRATING BETWEEN MEMORY ACCESS REQUESTS

(75) Inventors: Anton Rozen, Gedera (IL); Roman Mostinski, Jerusalem (IL); Michael Priel, Hertzelia (IL); Leonid Smolyansky, Orot (IL)

(73) Assignee: Freescale Semiconductor, Inc., Austin, TX (US)

( * ) Notice: Subject to any disclaimer, the term of this patent is extended or adjusted under 35 U.S.C. 154(b) by 208 days.

(21) Appl. No.: 12/179,799

(22) Filed: Jul. 25, 2008

(65) Prior Publication Data

US 2010/0023653 A1    Jan. 28, 2010

(51) Int. Cl.
*G06F 3/00* (2006.01)
(52) U.S. Cl. .......................... 710/40; 710/244; 711/158
(58) Field of Classification Search .................. 713/320; 710/36, 37, 39, 40; 711/158
See application file for complete search history.

(56) References Cited

U.S. PATENT DOCUMENTS

| | | | |
|---|---|---|---|
| 4,400,771 A | 8/1983 | Suzuki et al. | |
| 6,330,647 B1 * | 12/2001 | Jeddeloh et al. | 711/158 |
| 7,849,277 B2 * | 12/2010 | Matsutani | 711/158 |
| 2002/0026543 A1 * | 2/2002 | Tojima et al. | 710/22 |
| 2006/0117123 A1 * | 6/2006 | Izumida | 710/244 |
| 2007/0143640 A1 * | 6/2007 | Simeral et al. | 713/320 |
| 2007/0234091 A1 * | 10/2007 | Vishin et al. | 713/322 |
| 2008/0174295 A1 * | 7/2008 | Lee | 323/318 |
| 2008/0183913 A1 * | 7/2008 | Ryu et al. | 710/25 |
| 2008/0288796 A1 * | 11/2008 | Nakamura et al. | 713/320 |
| 2009/0113178 A1 * | 4/2009 | Kim et al. | 712/205 |

FOREIGN PATENT DOCUMENTS

| | | |
|---|---|---|
| WO | 03100625 A1 | 12/2003 |
| WO | 2006057841 A1 | 6/2006 |

* cited by examiner

*Primary Examiner* — Chun-Kuan Lee
*Assistant Examiner* — Ernest Unelus

(57) ABSTRACT

A system having memory access capabilities, the system includes: (i) a dynamic voltage and frequency scaling (DVFS) controller, adapted to determine a level of a voltage supply supplied to a first memory access requester and a frequency of a clock signal provided to the first memory access requester and to generate a DVFS indication that is indicative of the determination; (ii) a hardware access request determination module, adapted to determine a priority of memory access request issued by the first memory access requester in response to the DVFS indication; and (iii) a direct memory access arbitrator, adapted to arbitrate between memory access requests issued by the first memory access requester and another memory access requester in response to priorities associated with the memory access requests.

20 Claims, 4 Drawing Sheets

SYSTEM AND METHOD FOR ARBITRATING BETWEEN MEMORY ACCESS REQUESTS

FIELD OF THE INVENTION

This disclosure relates generally to a system and method for arbitrating between memory access requests.

BACKGROUND OF THE INVENTION

Integrated circuits include increasing numbers of memory access requestors such as video processing units, graphical processing units, general purpose processors, peripherals, and the like. The amount of information consumed by these memory access requesters as well as their expected throughput is constantly increasing.

On the other hand, the power consumption of the integrated circuit should be maintained at a relative low level, especially in integrated circuits that are powered by batteries. Accordingly, an integrated circuit is expected to provide a trade-off between performance (throughput, speed) and power consumption.

Various power reductions techniques include dynamic voltage and frequency scaling (DVFS), and power gating. DFVS alters the voltage supply level and the frequency of clock signals that are provided to a circuit while power gating involves shutting down the entire circuit or selected portions of that circuit.

The power consumption of various memory access requesters can be reduced by applying DVFS techniques.

SUMMARY OF THE PRESENT INVENTION

The present invention provides a method and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

In the following specification, the invention will be described with reference to specific examples of embodiments of the invention. It will, however, be evident that various modifications and changes may be made therein without departing from the broader spirit and scope of the invention as set forth in the appended claims.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

It has been shown that the DVFS state of a memory access requestor should affect the priority of the memory access requests generated by that memory access requester.

It has been shown that a hardware access request determination module, can quickly determine the priority of memory access request issued by a memory access requester in response to a DVFS indication that reflects the DVFS state of the memory access requester.

The priority of memory access requests issued from the memory access requester is lowered when the memory access requestor is provided with a higher voltage supply and a clock signal of a higher frequency. This prevents flooding the memory access controller with many memory access requests that if responded to will prevent other memory access requesters from receiving an adequate service from the memory controller.

A DVFS state of a memory access requester indicates the supply voltage level and the frequency of a clock signal provided that memory access requester.

Figure 1:
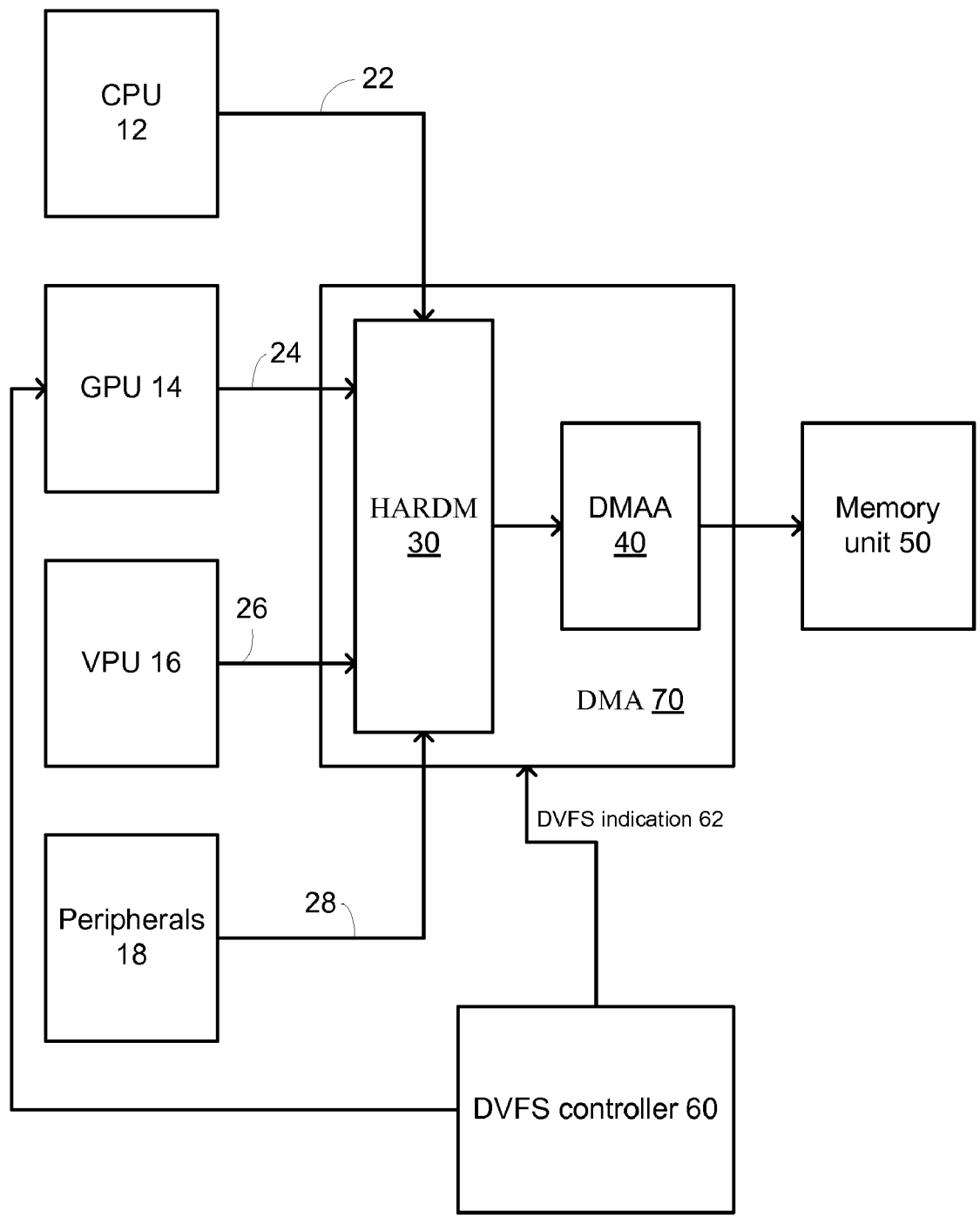
FIG. 1 schematically shows an example of an embodiment of a system.

FIG. 1 schematically shows an example of an embodiment of system 10.

System 10 includes dynamic voltage and frequency scaling (DVFS) controller 60, direct memory access (DMA) controller 70, four memory access requestors such as general purpose processor (CPU) 12, graphical processing unit (GPU) 14, video processing unit (VPU) 16 and peripherals 18 and memory unit 50. DMA controller 70 includes hardware access request determination module (HARDM) 30 and direct memory access arbitrator (DMAA) 40.

DMA controller 70 controls the access to memory unit 50 by arbitrating between memory access requests that are sent from the memory access requesters. The arbitration is responsive to the priority of access requests.

The following explanation assumes that the DVFS controller 60 affects the supply voltage and clock signal frequency provided to GPU 14 while the state of other memory access requesters maintains the same.

DVFS controller 60 can control the DVFS state of GPU 14 by determining a level of a voltage supply supplied to GPU 14 and a frequency of a clock signal provided to GPU 14. DVFS controller 60 also generates DVFS indication 62 that is indicative of the determination.

Hardware access request determination module 30 can determine a priority of a memory access request issued by GPU 14 in response to DVFS indication 62.

DMA arbitrator 40 arbitrates between memory access requests issued by GPU 14 and one or more other memory access requesters (out of CPU 12, VPU 16 and peripherals 18) in response to priorities associated with the memory access requests. It can, for example, apply a weighted round robin arbitration algorithm that is responsive to the priorities of arbitrated memory access requests.

Hardware request determination module 30 can perform at least one of the following operations, or a combination thereof: (i) reduce the priority of memory access requests issued by the GPU 14 in response to an increment in the frequency of the clock signal provided to GPU 14; (ii) increase the priority of memory access requests issued by one or more other memory access requesters in response to an increment in the frequency of the clock signal provided to GPU 14; (iii) select between sets of memory access request priorities.

Hardware access request determination module 30 change the priorities of one or more memory access requests issued by one or more memory access requestors so as to optimize a utilization of a memory unit that is accessed by the direct memory access arbitrator. The optimization takes into account the DFVS state of each memory access requestor, the memory unit throughput, and the relative throughput of each memory access requestor.

DVFS controller can control the DVFS state of more than one memory access requestor. In this case it can issue one or more DVFS indications that reflects the DVFS state of each of these memory access controller. In this scenario, the hardware access request determination module will determine the priorities between memory access requests issued by different memory access requesters in response to the state of each memory access requester.

Different memory access requestors can be placed at different states. For example, one memory access requester can be provided with a clock signal that has a higher frequency than a clock signal provided to another memory access requester. This difference can be a result of applying a DVFS technique but this is not necessarily so. For example, peripherals 18 usually receive a clock signal that has a lower frequency than the clock signal provided to CPU 12, although peripherals 18 are not subjected to DVFS techniques. Conveniently, the priority of the memory access requests issued by memory access requesters can be affected by their state.

Figure 2:
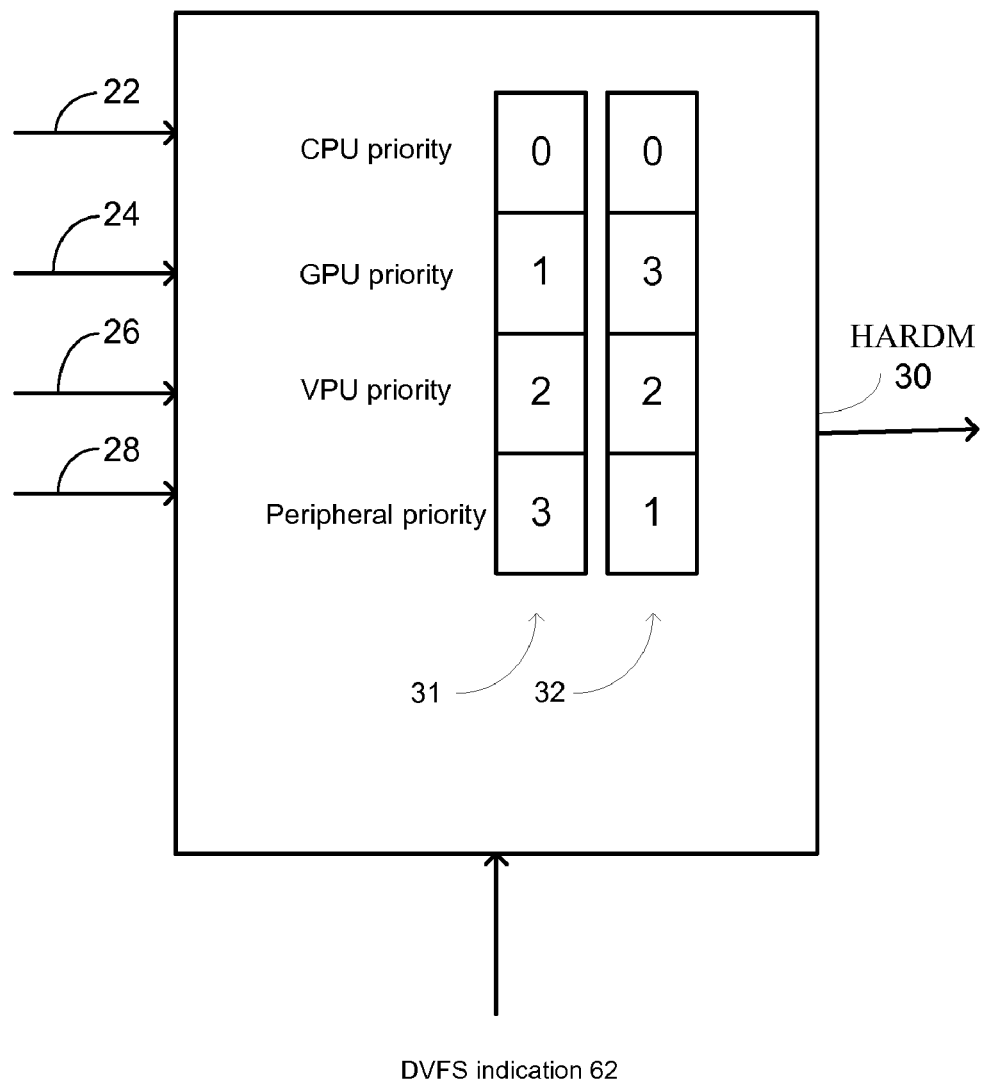
FIG. 2 schematically shows an example of an embodiment of a direct access memory controller.

FIG. 2 schematically shows an example of an embodiment of direct access memory controller 70.

DMA controller 70 receives access requests and determine to which memory access request to respond. It can respond to a memory access request issued by CPU 12 by transferring data over bus 22. It can respond to a memory access request issued by GPU 14 by transferring data over bus 24. It can respond to a memory access request issued by VPU 16 by transferring data over bus 26. It can respond to a memory access request issued by peripherals 18 by transferring data over bus 28.

Each memory access requester is associated with a certain priority. In the example of FIG. 2 two sets of priorities (31 and 32) are shown. DVFS indication 62 is used to select between these sets. For example, if the frequency of clock provided to GPU 14 is high (and a high voltage supply level is provided to GPU 14) then first set 31 is selected so as provide a low priority (1) to memory access requests issued from GPU 14. If, for example, the frequency of clock provided to GPU 14 is low (and a low voltage supply level is provided to GPU 14) then second set 32 is selected so as provide a high priority (3) to memory access requests issued from GPU 14.

Figure 3:
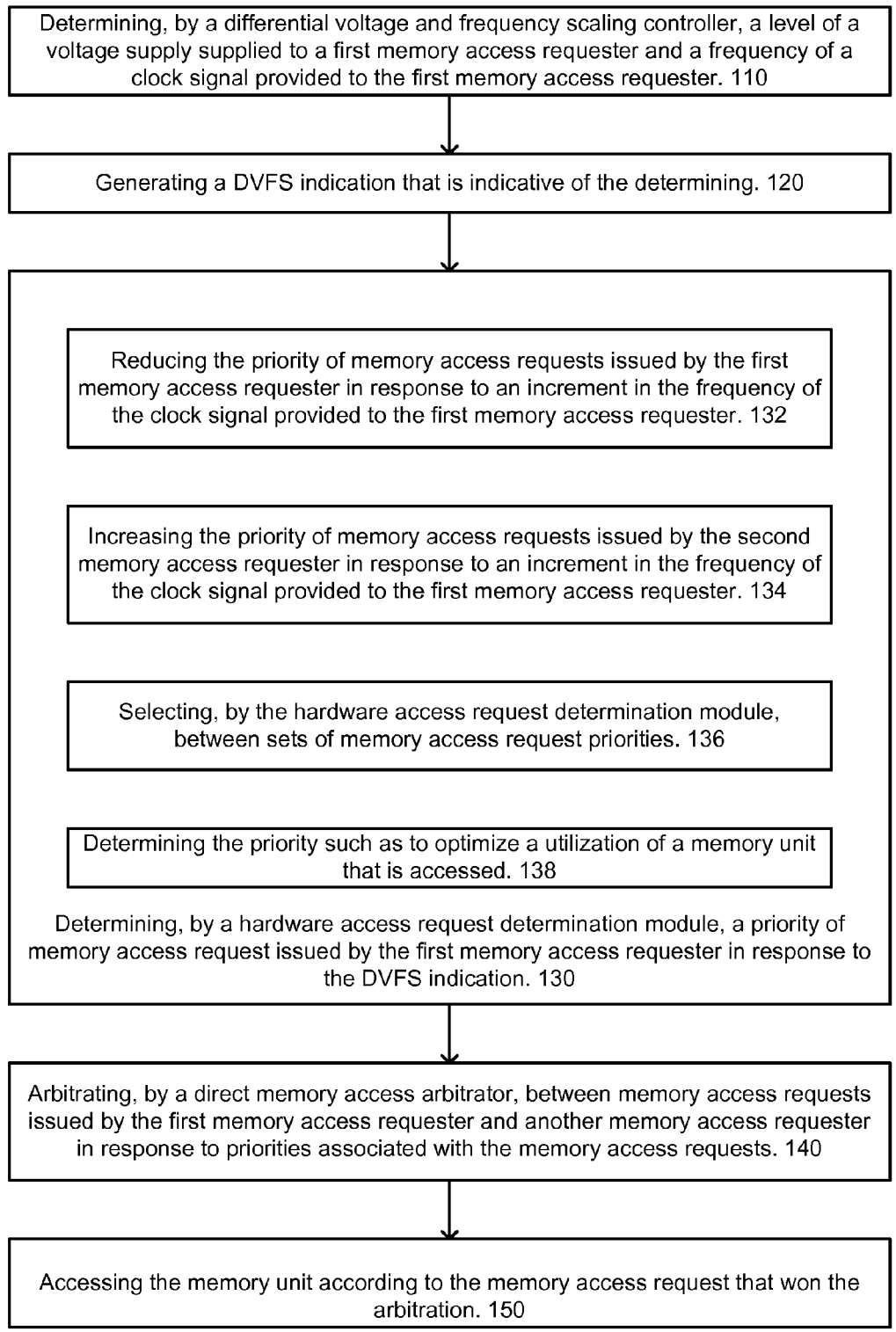
FIG. 3 schematically shows a flow chart of an example of an embodiment of a method.

FIG. 3 schematically shows a flow chart of an example of an embodiment of method 100.

Method 100 starts by stage 110 of determining, by a dynamic voltage and frequency scaling controller, a level of a voltage supply supplied to a first memory access requester and a frequency of a clock signal provided to the first memory access requester.

Stage 110 is followed by stage 120 of generating a DVFS indication that is indicative of the determining.

Stage 120 is followed by stage 130 of determining, by a hardware access request determination module, a priority of memory access request issued by the first memory access requester in response to the DVFS indication.

Stage 130 is followed by stage 140 of arbitrating, by a direct memory access arbitrator, between memory access requests issued by the first memory access requester and another memory access requester in response to priorities associated with the memory access requests. The priorities can also reflect memory access requester starvation, fairness policy, quality of service constrains, and the like.

Stage 140 can include applying a weighted round robin arbitration algorithm that is responsive to the priorities of arbitrated memory access requests.

Stage 140 is followed by stage 150 of accessing the memory unit according to the memory access request that won the arbitration.

Stage 130 can include any of the following stages or a combination thereof: (i) stage 132 of reducing the priority of memory access requests issued by the first memory access requester in response to an increment in the frequency of the clock signal provided to the first memory access requester; (ii) stage 134 of increasing the priority of memory access requests issued by the second memory access requester in response to an increment in the frequency of the clock signal provided to the first memory access requester; (iii) stage 136 of selecting, by the hardware access request determination module, between sets of memory access request priorities; (iv) stage 138 of determining the priority such as to optimize a utilization of a memory unit that is accessed.

Figure 4:
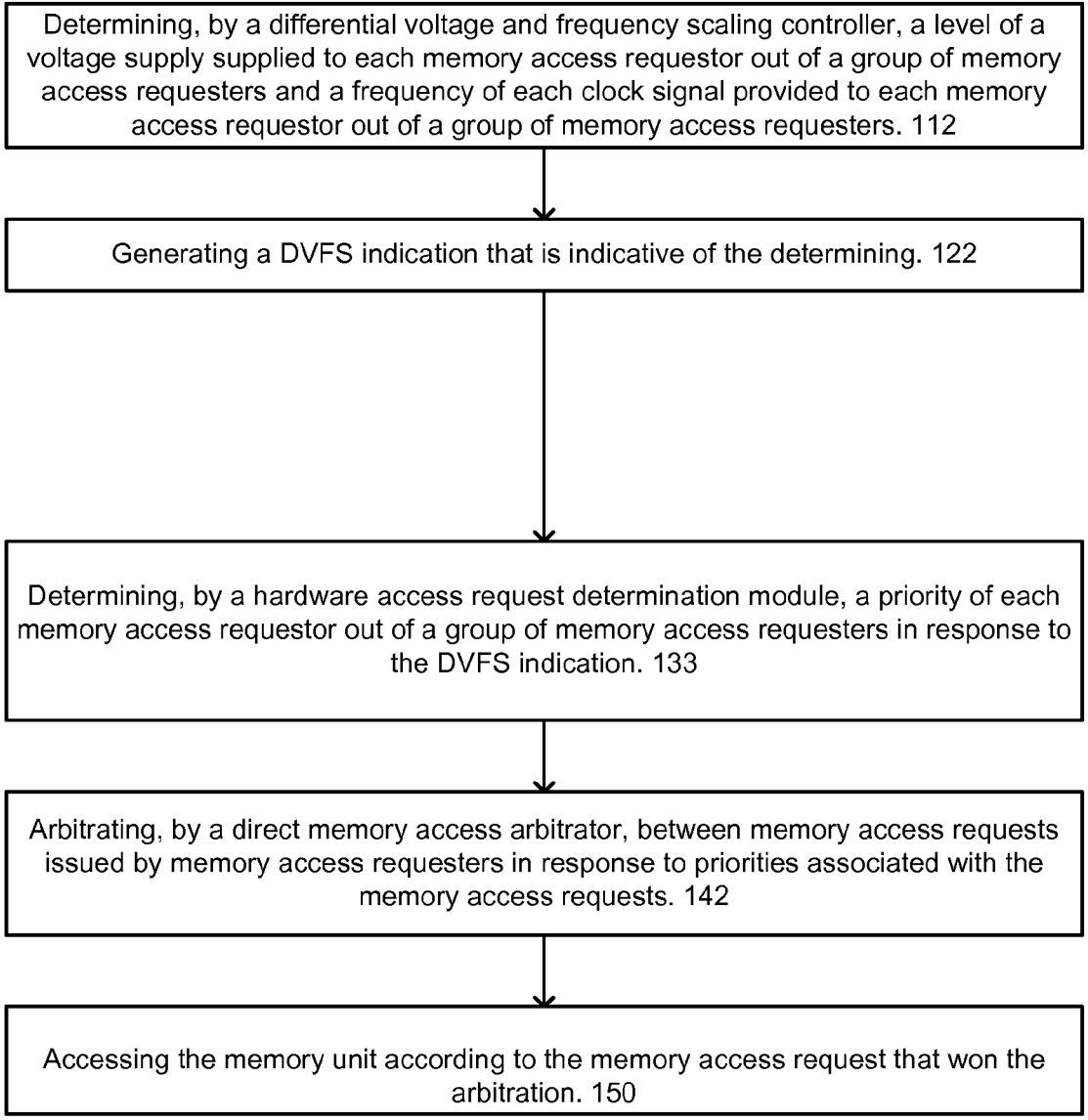
FIG. 4 schematically shows a flow chart of an example of an embodiment of a method.

FIG. 4 schematically shows a flow chart of an example of an embodiment of method 102.

Method 102 can be applied when the DVFS state of multiple memory access requesters is determined.

Method 102 starts by stage 112 of determining, by a dynamic voltage and frequency scaling controller, a level of a voltage supply supplied to each memory access requester out of a group of memory access requesters and a frequency of each clock signal provided to each memory access requester out of a group of memory access requesters.

Stage 112 is followed by stage 122 of generating a DVFS indication that is indicative of the determining.

Stage 122 is followed by stage 133 of determining, by a hardware access request determination module, a priority of each memory access requester out of a group of memory access requesters in response to the DVFS indication.

Stage 133 is followed by stage 142 of arbitrating, by a direct memory access arbitrator, between memory access requests issued memory access requesters in response to priorities associated with the memory access requests. The priorities can also reflect memory access requestor starvation, fairness policy, quality of service constrains, and the like.

Stage 133 can include stages that are analogues to stage 132, 134, 136 and 138.

Stage 142 can include applying a weighted round robin arbitration algorithm that is responsive to the priorities of arbitrated memory access requests.

Stage 142 is followed by stage 150 of accessing the memory unit according to the memory access request that won the arbitration.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

The word 'comprising' does not exclude the presence of other elements or steps then those listed in a claim.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A system having memory access capabilities, comprising:
    a dynamic voltage and frequency scaling (DVFS) controller, that determines a level of a voltage supply supplied to a first memory access requester and a frequency of a clock signal provided to the first memory access requester and generates a first DVFS indication that is indicative of the determination;
    a hardware access request determination module that includes a plurality of sets of memory access request priorities, and that selects a first set of memory access request priorities of the plurality of sets of memory access request priorities in response to the first DVFS indication; and
    a direct memory access arbitrator that arbitrates between memory access requests issued by the first memory access requester and a second memory access requester in response to the first set of memory access request priorities.

2. The system according to claim 1 wherein the hardware request determination module selects a second set of memory access request priorities of the plurality of sets of memory access request priorities, the second set of memory access request priorities having a reduced priority for memory access requests issued by the first memory access requester in response to an increment in the frequency of the clock signal provided to the first memory access requester.

3. The system according to claim 1 wherein the hardware request determination module selects a second set of memory access request priorities of the plurality of sets of memory access request priorities, the second set of memory access request priorities having an increased priority for memory access requests issued by the second memory access requester in response to an increment in the frequency of the clock signal provided to the first memory access requester.

4. The system according to claim 1 wherein the direct memory access arbitrator applies a weighted round robin arbitration algorithm that is responsive to the first set of memory access request priorities.

5. The system according to claim 1 wherein the first memory access requester is a graphical processing unit and the second memory access requester is a general purpose processing unit.

6. The system according to claim 1 wherein the first set of memory access request priorities is selected by the hardware access request determination module so as to optimize a utilization of a memory unit that is accessed by the direct memory access arbitrator.

7. The system according to claim 1 wherein;
    the DVFS controller further determines a level of a voltage supply supplied to each memory access requester out of a group of memory access requesters and a frequency of each clock signal provided to each memory access requester out of a group of memory access requesters and generate a second DVFS indication that is indicative of the determinations; and
    the hardware access request determination module further selects a second set of memory access request priorities in response to the second DVFS indication.

8. A method for accessing a memory unit, the method comprising:
    determining, by a dynamic voltage and frequency scaling (DVFS) controller, a level of a voltage supply supplied to a first memory access requester and a frequency of a clock signal provided to the first memory access requester;
    generating a first DVFS indication that is indicative of the determining;
    selecting, by a hardware access request determination module a first set of memory access request priorities of a plurality of sets of memory access request priorities in response to the first DVFS indication; and
    arbitrating, by a direct memory access arbitrator, between memory access requests issued by the first memory access requester and a second memory access requester in response to the first set of memory access request priorities.

9. The method according to claim 8 comprising selecting a second set of memory access request priorities of the plurality of sets of memory access request priorities, the second set of memory access request priorities having a reduced priority for memory access requests issued by the first memory access requester in response to an increment in the frequency of the clock signal provided to the first memory access requester.

10. The method according to claim 8 comprising selecting a second set of memory access request priorities, the second set of memory access request priorities having an increased priority for memory access requests issued by the second memory access requester in response to an increment in the frequency of the clock signal provided to the first memory access requester.

11. The method according to claim 8 comprising applying a weighted round robin arbitration algorithm that is responsive to the first set of memory access request priorities.

12. The method according to claim 8 wherein the first memory access requester is a graphical processing unit and the second memory access requester is a general purpose processing unit.

13. The method according to claim 8, wherein the selecting the first set of memory access request priorities is done so as to optimize a utilization of a memory unit that is accessed.

14. The method according to claim 8 comprising:
   determining a level of a voltage supply supplied to each memory access requestor out of a group of memory access requesters and a frequency of each clock signal provided to each memory access requester out of a group of memory access requesters;
   generating a second DVFS indication that is indicative of the determinations; and
   selecting a second set of memory access request priorities in response to the second DVFS indication.

15. A system having memory access capabilities, comprising:
   a dynamic voltage and frequency scaling (DVFS) controller, that changes a first level of a voltage supply supplied to a first memory access requester of a plurality of memory access requesters and a first frequency of a clock signal provided to the first memory access requester and generates a first DVFS indication that is indicative of the change;
   a hardware access request determination module, that:
      selects a first set of priorities for memory access requests issued from the plurality of memory access requestors, wherein the first set of priorities is selected from a plurality of stored sets of priorities, and the first set of priorities includes a priority of the first memory access request, the selection being in response to the first DVFS indication; and
   a direct memory access arbitrator, that arbitrates between the memory access requests included in the first set of priorities in response selecting the first set of priorities.

16. The system according to claim 15 wherein the hardware access request determination module selects a second set of priorities, the second set of priorities having a reduced priority for memory access requests issued by the first memory access requester in response to an increment in the frequency of the clock signal provided to the first memory access requester.

17. The system according to claim 15 wherein the hardware access request determination module selects a second set of priorities, the second set of priorities having an increased priority for second memory access requests issued by another memory access requester of the plurality of memory access requesters in response to an increment in the frequency of the clock signal provided to the first memory access requester.

18. The system according to claim 15 wherein;
   the DVFS controller further determines a second level of a voltage supply supplied to a second memory access requester of the plurality of memory access requesters and a second frequency of a clock signal provided to the second memory access requester and generate a second DVFS indication that is indicative of the determinations; and
   the hardware access request determination module further:
      selects a second set of priorities of the plurality of sets of priorities for memory access requests issued from the plurality of memory access requestors, wherein the second set of priorities includes a priority of the second memory access request, the selection being in response to the second DVFS indication.

19. The system according to claim 15, wherein the direct memory access arbitrator applies a weighted round robin arbitration algorithm that is responsive to the first set of priorities.

20. The system according to claim 15, wherein the first memory access requester is a graphical processing unit.

* * * * *